United States Patent Office 3,463,900
Patented Aug. 26, 1969

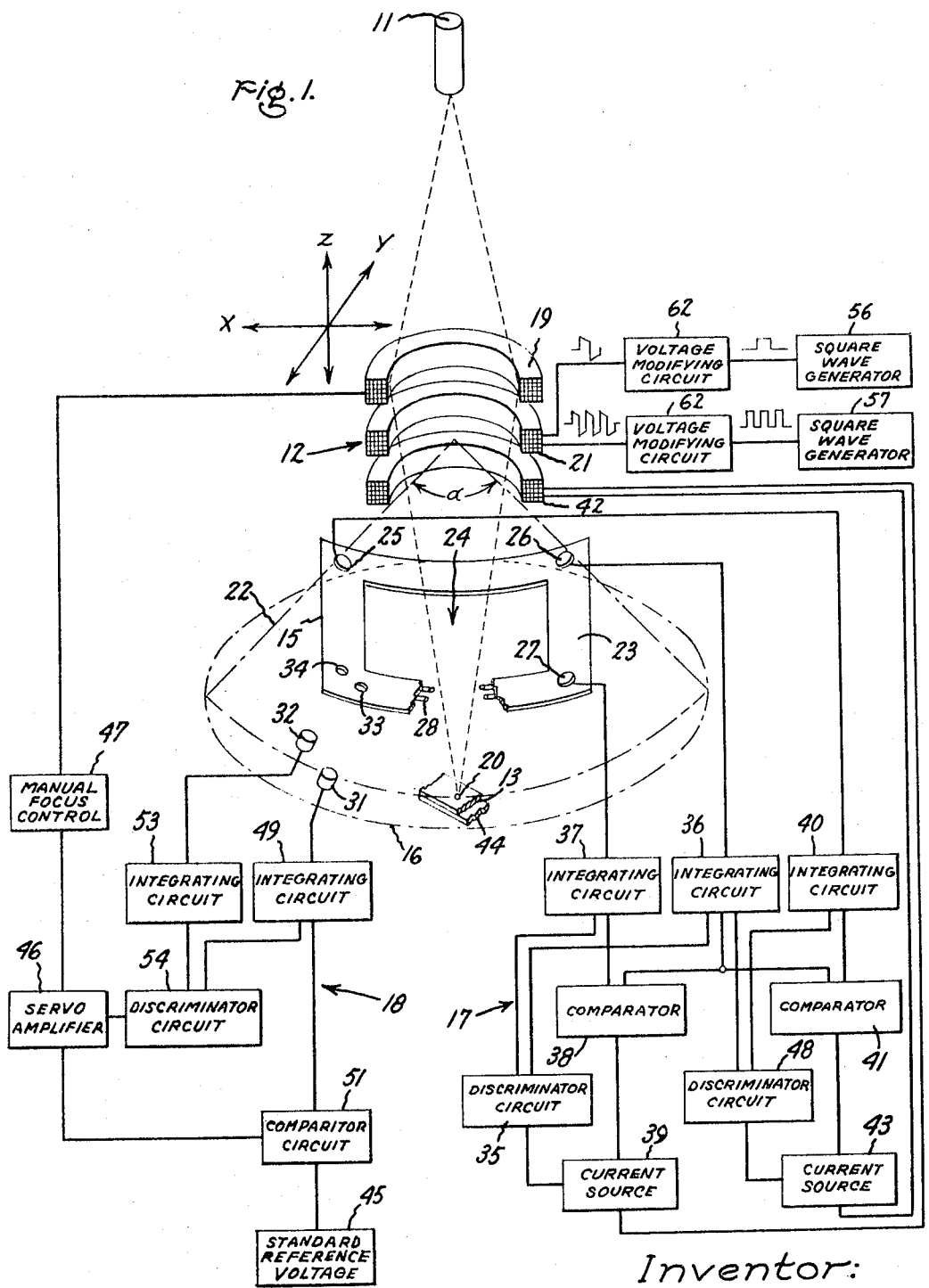

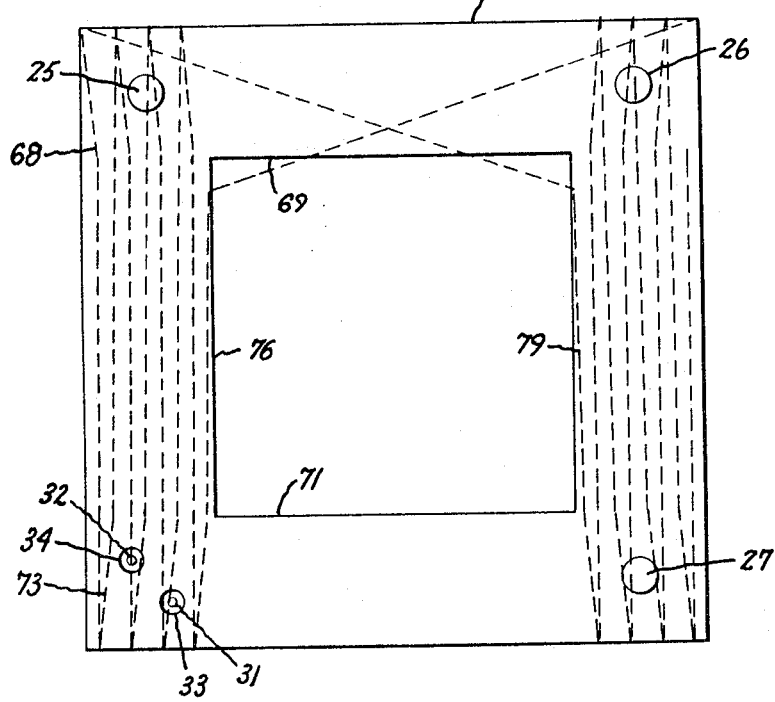
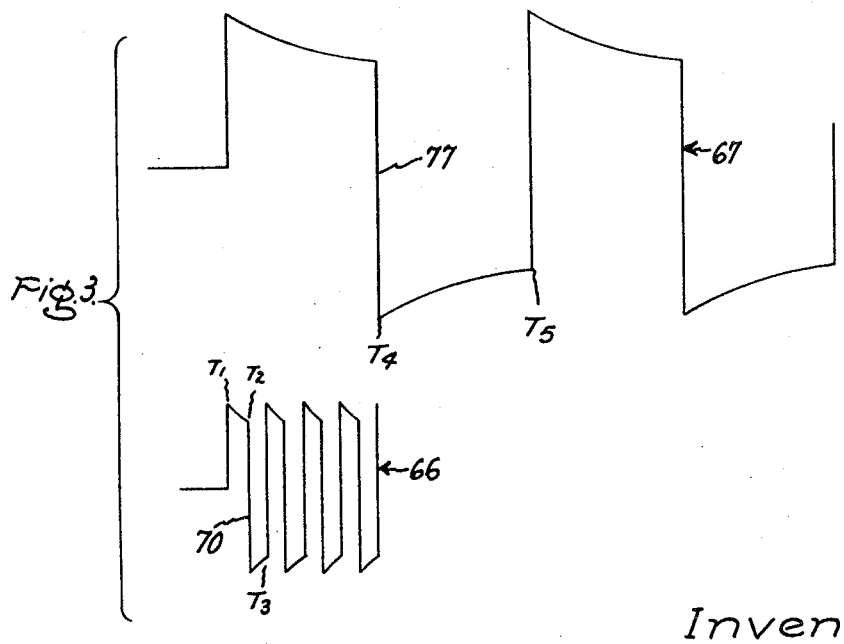

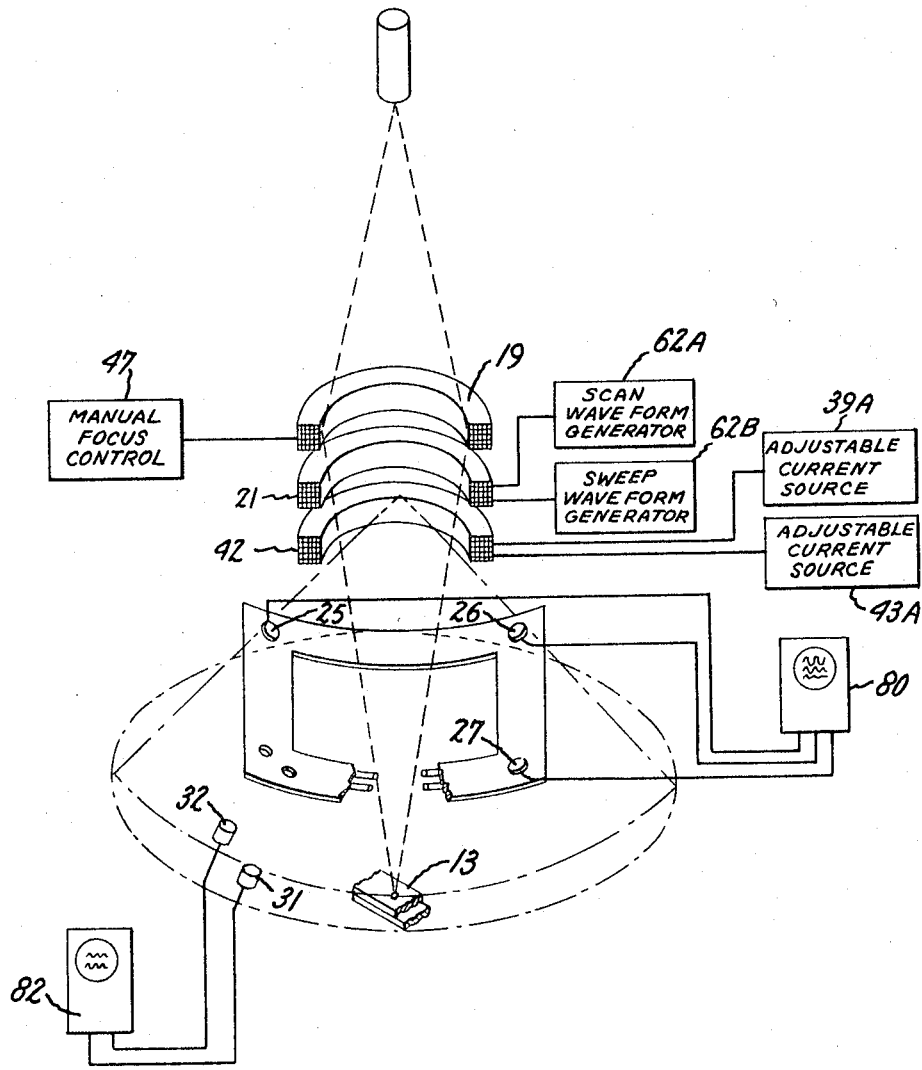

3,463,900
ELECTRON BEAM WELDING APPARATUS
Robert D. Downing, Schenectady, N.Y., assignor to General Electric Company, a corporation of New York
Filed July 10, 1967, Ser. No. 652,123
Int. Cl. H05b 7/18
U.S. Cl. 219—121                                     8 Claims

ABSTRACT OF THE DISCLOSURE

The location of an electron beam utilized in electron beam welding is determined by a detector having three Faraday cages right triangularly disposed about the electron beam and lying in a plane perpendicular to the desired axial disposition of the electron beam during a welding operation. The beam is simultaneously scanned and swept across the three Faraday cages and the output signals from the cages produced by the electron beam traversal are compared to determine the location of the beam in the plane of the workpiece. A fourth Faraday cage is situated along an arc defined by the focal point of a properly positioned electron beam during a beam traversal and the output from the fourth Faraday cage functions to produce a signal proportional to the position of the focal point of the beam along the axial plane. Feedback circuits are provided to automatically position and focus the electron beam upon the focal spot location required for the production of high quality welds in the workpiece.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to a charged particle beam apparatus and in particular to a charged particle beam apparatus wherein the location of the beam is electronically determined and automatically controlled by the traversal of the beam relative to a plurality of sensors.

The exact positioning of a charged particle beam is of critical importance in many applications such as electron beam particle accelerators, ion depositions during the formation of semiconductors and electron beam welding. For example in electron beam welding, the focal point of an electron beam must be located properly with respect to the workpiece in order to produce a weld of maximum strength. Obviously, location in the plane of the workpiece is important since a weak off-center weld may be produced if the electron beam is not properly positioned relative to the joint. In addition, the axial location of the focal point with respect to the workpiece is of utmost importance. Thus if the electron beam is focused precisely at the surface of the joint, the weld may not be deep enough to provide the desired strength while a focusing of the beam on a point too far below the surface of the workpiece can result in an enlarged weld of inferior quality.

Prior attempts to accurately determine the focal point of a charged particle beam have included the mounting of search coils around an electron beam in a welding apparatus and the pulsing of the beam by a control electrode to induce a voltage in the coils indicative of the beam location. The pulsed beam method has not proved successful however because the focal point of the electron beam varies in an axial direction dependent upon the control electrode voltage. Thus while electron beam pulsing may give an indication of the beam's position relative to the plane of the workpiece, the location of the focal point of the beam in an axial direction is not accurately determined.

In my prior application Ser. No. 539,757 entitled "Electron Beam Welding Apparatus" filed Apr. 4, 1966, and assigned to the assignee of the present invention, there is disclosed and claimed an electron beam welding apparatus wherein the focal point of an electron beam is determined by sweeping the beam transversely relative to an inclined electrode. The electrode preferably is located on the work table and the focal point of the beam in a single plane is determined by an orthogonal movement of the electrode relative to the traversing electron beam. A movement of the electrode in a second direction and an alteration of the beam sweep is required to locate the focal point of the beam in space, e.g. relative to 3 planes. Because the inclined electrode occupies the desired location for the workpiece, the workpiece can be inserted into a welding position only after a determination of the beam focal point by the inclined electrode. Similarly, if the need arises for a determination of the beam focal point during welding, the workpiece generally must be removed from below the beam in order not to interfere with movement of the inclined electrode.

It is therefore an object of this invention to provide a charged particle beam apparatus having a mechanically stationary detection system for the spatial determination of the focal point of the beam.

It is also an object of this invention to provide a charged particle beam apparatus having a detection system capable of automatically correcting the positioning of the focal point of the beam upon a deviation of the focal point from a desired location.

It is a further object of this invention to provide a charged particle beam apparatus having a relatively simply constructed beam detection system remotely situated relative to the desired location for impingement upon a workpiece.

It is still another object of this invention to provide a charged particle beam apparatus wherein a determination of focal point location can be made without removal of the workpiece from below the beam.

These and other objects of this invention generally are accomplished in a charged particle beam apparatus having a source of charged particles and means for focusing the charged particles into a beam impinging upon a desired location by disposing a plurality of spaced-apart sensors about the charged particle beam at locations diverse from the desired impingement location of the charged particles. A traversal is effected between the charged particle beam and the sensors to produce output signals from the sensors which signals are compared by suitable means to determine the location of the beam in planes orthogonal to the beam.

The axial position of the focal point of the beam is detected in the charged particle beam apparatus by sensor means remotely disposed relative to the desired beam impingement location. Means are provided for effecting a traversal of the charged particle beam across the sensor means which sensor means are located along a path defined by the focal point of the beam during the traversal of a properly focused beam. When a charged particle beam having an axially unknown focal point is traversed across the sensor means, an output signal is produced from the sensor means proportional to the axial deviation of the charged particle beam focal point from the desired beam impingement location and means responsive to the output signal from the sensor means function to focus the charged particle beam upon the desired location.

The features of the invention believed to be novel are set forth with particularity in the appended claims. The invention itself, however, both as to organization and method of operation, together with further objects and adventages thereof, may best be understood by reference to the following description taken in conjunction with the accompanying drawings in which:

FIG. 1 is a schematic diagram of an electron beam welding apparatus in accordance with this invention, FIG. 2 is a plan view of the detector employed in the electron beam welding apparatus of FIG. 1, FIG. 3 depicts waveforms suitable for traversing the electron beam at diverse rates across the detector, and FIG. 4 is a schematic portrayal of an electron beam apparatus suitable for beam focal point detection during welding.

A charged particle beam apparatus constructed in accordance with this invention is specifically depicted in FIG. 1 as an electron beam welding apparatus and includes an electron beam source 11, a plurality of electromagnetic focusing and deflection coils, generally identified by reference numeral 12, for positioning the electron beam upon the workpiece 13 to be welded, and a centrally apertured detector 15 for spatially locating the focal point of the beam. The location of the electron beam focal point, as sensed by detector 15, is fed to a beam steering circuit 17 and a focus control circuit 18 to properly position the beam upon the workpiece to be welded.

Electron beam source 11 may be any conventional source utilized to produce an electron beam of sufficient intensity for welding purposes, e.g. the source may comprise a hot cathode electron emitter such as a Pierce gun or the source may comprise a cold cathode device such as a plasma electron beam structure. The beam generated by source 11 passes through an electromagnetic focusing lens 19 which lens focuses the electron beam upon a desired spot location 20 to produce a good weld in workpiece 13. The depth of the focal spot within workpiece 13 is variable dependent upon the material to be welded and generally lies between ¼ and ½ the thickness of the workpieces for most metals.

An electromagnetic deflection coil 21 is positioned immediately below focusing lens 19 and functions to simultaneously sweep and scan the electron beam across detector 15 during a determination of the spatial location of the electron beam focal point. The direction of the sweep and scan preferably are mutually perpendicular and that portion of the centermost, or axial, electron beam below deflection coil 21 traverses an approximately spherical segment 22 having a large arcuate angle $\alpha$, e.g. 90°, to give a substantial field of scan. Thus if the axial direction of an undeflected axial electron beam from source 11 to workpiece 13 is considered to be along the Z axis, a sweep current applied to deflection coil 21 preferably produces a beam motion along the Y axis while a scan current applied to the deflection coil will produce a beam motion along the X axis. Although the operation of deflection coil 21 is somewhat similar to the operation of a deflection coil in a conventional television video tube, deflection coil 21 preferably is non-compensated so that the focal point of the beam traverses an arcual pattern as the electron beam is moved in the X or Y direction. When non-synchronous currents are applied to the sweep and scan portions of deflection coil 21, the focal point of electron beam 14 generally defines a surface 16 approximating a spherical arc having a center situated along the plane of deflection coil 21.

Detector 15 generally comprises a rectangular framelike structure 23 of a high heat conductivity metal, e.g. copper, having a central aperture 24 for the passage of the electron beam to workpiece 13. Although aperture 24 is depicted as being substantial in dimension for clarity of illustration, in actual practice the aperture is approximately equal to the width of a properly focused electron beam for workpiece 13 while framelike structure 23 is relatively large to be impinged upon by the electron beam during a major portion of the beam traversal. Three spaced-apart sensors 25, 26 and 27 are situated along three corners of the detector with sensors 25 and 26 being aligned parallel to the X axis and sensors 26 and 27 being aligned parallel to the Y axis. All three sensors are aligned in a Z plane, e.g. a plane perpendicular to the beam axis, preferably at an elevation differing from the generally spherical arc 16 defined by the focal point of the electron beam during a beam traversal by deflection coil 21. Thus the electron beam strikes the detector 15 and sensors 25, 26 and 27 in a non-focused condition thereby minimizing the energy density of the beam upon the detector and the possibility of damage to the detector due to melting. A plurality of conduits 28 are situated along the lower surface of detector 15 and serve as passageways for a flowing coolant functioning to transfer heat from the detector by conduction. Faraday cages are preferred for utilization as the electron beam sensors because of the relative immunity of the Faraday cage to radiation damage. However, any other type sensor capable of detecting the presence of an electron beam, e.g. solar cells or thermistors, also can serve as the sensors within detector 15.

Fourth and fifth Faraday cages 31 and 32 are positioned in registration with dual apertures 33 and 34 in detector 15, respectively, with Faraday cage 31 being situated along the generally spherical arc 16 defined by a beam traversal wherein the focus of a properly centered electron beam passes through the desired focal spot location 20 for welding of workpiece 13. Faraday cage 32 is positioned along a generally spherical arc concentric with and of smaller radius than the spherical arc 16 wherein Faraday cage 32 is situated. Suitable means (not shown), such as a screw thread drive, are provided to radially adjust the positioning of Faraday cage 31 dependent upon the thickness and material of workpiece 13 to conform the location of cage 31 with the desired focal spot arc for the particular workpiece.

As the electron beam is swept by deflection coil 21 across sensors 26 and 27, e.g. parallel to the Y axis, an output signal is produced by each sensor proportional to the intensity of the electron beam striking the sensor. When the beam is directly centered between the sensors, the output signals from sensors 26 and 27 are equal. However, when the electron beam is not centered between the sensors, e.g., the beam is located more proximate sensor 26 than sensor 27, the magnitude of the output signal from sensor 26 is greater in magnitude than the output signal from sensor 27 due to variations in the intensity of the impinging electron beam along the axial length of the beam. The output signals from sensors 26 and 27 are fed to relatively long time constant integrating circuits 36 and 37, respectively, e.g. a time constant of approximately 3 seconds or longer is suitable for a 150 ma. electron beam at a sweep frequency of 60 cycles, to produce a voltage output from the integrating circuits proportional to the generated signals from the sensors over a long time interval, e.g., 3 seconds. By integrating over a long time period, the degree of interaction between a sensor and the electron beam during a single scan is diminished and the signal produced by an integrating circuit having a long time constant, e.g. 3 seconds, is proportional to the generated signals from the sensors over a large number of scans, e.g., 180 scans for a scan frequency of 60 cycles per second. Besides summing the signals from the sensors over a plurality of scans, the integrating circuits also function to produce an output signal having a magnitude, as determined principally by the beam current and the dwell period of the beam upon the sensors, which can be more conveniently utilized. The output voltages from integrating circuits 36 and 37 are fed to a comparator circuit 38, such as a differential amplifier, to produce an output signal corresponding to the difference between the generated signals from the sensors over the time interval of integrating circuits 36 and 37.

The direction of the beam misalignment is determined by a discriminator circuit 35, e.g. a differentially fed transformer winding, which circuit receives the output signals from integrating circuits 36 and 37 and generates an output signal indicative of the respective magnitudes of the integrated output from sensors 25 and 26. The output signals from comparator 38 and discriminator 35 are applied to adjustable current source 39 to control the magnitude and polarity of the correctional current waveform applied to steering coil 42 to move the electron beam along the Y axis to a center location between sensors 26 and 27.

The location of the electron beam along the X axis is detected in a manner similar to that used in the detection of the beam along the Y axis. Thus the electron beam is scanned by deflection coil 21 parallel to the X axis across sensors 25 and 26 to produce output signals from the sensors proportional to the intensity of the electron beam striking the sensors, e.g. proportional to the axial distance of the sensors along the traversed electron beam. When the electron beam is centered intermediate sensors 25 and 26, equal voltages are produced by the sensors. If the beam is situated more proximate sensor 25 than 26, the output signal from sensor 25 is in excess of the output signal produced by sensor 26. The output signals from the sensors then are fed to integrating circuits 36 and 40 which circuits function to sum the output signals from each of the sensors 25 and 26 over a relatively long period, for example three seconds, before the integrated output signals are compared in comparator circuit 41 to produce a signal proportional to the difference in the generated signals from the Faraday cages. The integrated output signals from sensors 25 and 26 also are applied to a discriminator circuit 48 to produce an output signal indicative of the respective magnitudes of the signals from the sensors. The output signals from comparator 41 and discriminator circuit 48 then are fed to adjustable current source 43 which source generates a correction signal of a magnitude and polarity for steering coil 42 to electromagnetically center the electron beam between sensors 25 and 26. Because workpiece 13 can be positioned relative to the known locations of the sensors along detector 15, centering of the electron beam from source 11 between sensors 25 and 26 and between sensors 26 and 27 assures proper positioning of the beam along the plane of workpiece 13 relative to the joint to be welded. By situating detector 15 outside the desired focal plane of the electron beam for welding, workpiece 13 can be positioned upon work table 44 prior to the detection of the focal point of the beam and the operator of the welding apparatus is allowed uninhibited observation of the positioning of the workpiece.

The location of the focal point of the electron beam along a Z plane, or axial plane, is detected and controlled by focus control circuit 18 which circuit generally includes Faraday cages 31 and 32, a standard reference voltage source 45 and a servo amplifier 46 controlling the positioning of manual focus control 47. Faraday cage 31 is positioned below detector 15 along the approximately spherical arc 16 defined by the focal point of a properly centered electron beam during a beam traversal wherein the focal point passes through the desired spot location 20 for welding and is aligned with aperture 33 in the detector to permit impingement of the electron beam upon the Faraday cage as the electron beam is traversed over aperture 33. The output signal from Faraday cage 31 is fed to an integrating circuit 49 having a long time constant, e.g. approximately 3 seconds or more, to provide an output signal proportional to the sum of the signals generated by Faraday cage 31 over a plurality of scans during the period of the time constant. The output from integrating circuit 49 and a standard reference voltage from source 45, which reference voltage is set equal to the obtainable voltage output from Faraday cage 31 during a traversal of a welding power electron beam situated directly upon the desired focal spot location for welding workpiece 13, are applied to a comparator circuit 51 to produce an output signal proportional to the variation between the actual generated output from Faraday cage 31 and the generated output from the Faraday cage when the focal point of a properly positioned electron beam is traversed across the Faraday cage. Because the obtainable voltage from Faraday cage 31 is dependent upon such factors as the electron beam power employed for welding and the speed of the beam sweep across the Faraday cage, reference voltage source 45 preferably is a variable source, e.g. a potentiometer, and the voltage settings for various beam power levels are determined empirically during an initial testing of the electron beam apparatus. The output signal from comparator circuit 51 is fed as an error signal to servo amplifier 46 which servo amplifier, upon receipt of the error signal, moves manual focus control 47 by an amount proportional to the magnitude of the error signal. Movement of manual focus control 47 adjusts the current in focusing lens 19 to properly focus the electron beam upon workpiece 13.

Because the output voltage produced by Faraday cage 31 decreases upon axial movement of the electron beam focal point away from the Faraday cage in either direction, a second Faraday cage 32 is positioned proximate Faraday cage 31 to determine the direction of the axial movement of the focal point. Faraday cage 32 is positioned in alignment with aperture 34 of detector 15 and preferably is situated along an arc above and concentric with the arc 16 wherein detector 31 lies. Thus if the focal point of electron beam moves axially upwardly toward the surface of workpiece 13, the focal point of the traversed electron beam approaches more proximate Faraday cage 32 and the output voltage produced by Faraday cage 32 increases. The upward movement of the focal point also results in a lower output voltage from Faraday cage 31 which cage is axially situated at the desired focal point of the beam for welding the workpiece.

The output voltage from Faraday cage 32 is fed to an integrating circuit 53 having a relatively long time constant, e.g. preferably at least 3 seconds, to provide a voltage output from the integrating circuit proportional to the sum of the voltages generated during a plurality of traversals of the Faraday cage by the electron beam. The output of integrating circuit 53 is compared with the output of integrating circuit 49 in a discriminator circuit 54, e.g. a differentially fed transformer winding, to produce an output voltage from the discriminator circuit characteristic of the axial movement of the focal point. The output of discriminator circuit 54 then is fed to servo amplifier 46 to control the direction of movement of the servo amplifier. Thus variations between the output voltage produced by Faraday cage 31 and standard reference voltage source 45 determine the degree of adjustment required of manual focus circuit 47 while a comparison of the output voltages of Faraday cages 31 and 32 determine the axial direction of the correction required. The output signal from manual focus circuit 47 then is applied to electromagnetic focusing lens 19 to properly focus the beam upon workpiece 13.

Although detector 15 preferably is situated outside the desired focal plane of a welding intensity electron beam to reduce the energy density of the beam on the detector, if sensors 25, 26 and 27 are positioned along the generally spherical arc 16 traversed by the focal point of a properly positioned electron beam, Faraday cage 31 is not required and the output signal from one of the sensors can serve to indicate a proper axial focusing of the beam.

The scan pattern preferred for traversing the electron beam across the sensors can best be understood with reference to FIGS. 2 and 3, wherein detector 15 and the sweep and scan voltages applied to deflection coil 21 are respectively depicted. Because the electron beam is functionally operative for measuring purposes only in the vicinity of the sensors during a traversal of the electron beam, the beam preferably is traversed slowly proximate the sensors with the traversal rate of the electron beam being increased along areas remote from the sensors. To effectuate this result, the sweep current 66 and scan current 67 applied to deflection coil 21 preferably exhibit a time rate change, e.g. a shallow slope or slow traversal rate in the areas of the sensors and a steep slope or fast traversal rate in areas remote from the sensors.

Referring again to FIG. 1, the sweep and scan currents for deflection coil 21 preferably are produced by a 60 cycle square wave current generator 56 and a 400 cycle square wave current generator 57, respectively, with the outputs from the square wave generators being applied to voltage modifying circuits 62, e.g., a series connected resistor and capacitor having a long time constant to produce an exponential drop in the applied square waves, prior to application of the current waveforms to deflection coil 21. Voltage modifying circuits 62 may be omitted when the square wave current generators inherently produce a sloping, poor quality "square" wave.

The sweep pattern of the electron beam across detector 15 can be observed in FIG. 2 in conjunction with current waveforms 66 and 67 depicted in FIG. 3 which waveforms are produced by voltage modifying circuits 62 and applied to deflection coil 21 to sweep and scan the electron beam across the detector. At time T1, maximum positive currents from the sweep and scan waveforms are applied to deflection coil 21 and the beam is positioned in the upper left hand corner of the detector depicted in FIG. 2. As the applied currents fall exponentially, the beam traverses a sloping path 68 across the portion of detector 15 proximate sensor 25 until time T2 when the beam is positioned along an extension of peripheral edge 69 of aperture 24 in the beam absorber whereupon the sharply sloping portion 70 of waveform 66 sweeps the beam to the lower left hand portion of detector 15 proximate Faraday cage 31. The electron beam traverses an exponential path 73 proximate Faraday cage 31 until time T3 when the beam has reached an extension of peripheral edge 71 of aperture 24 and the sharply sloping portion 70 of the applied sweep current to the deflection coil rapidly sweeps the electron beam back to a position proximate sensor 25. The beam continues sweeping detector 15 at a relatively slow rate proximate sensor 25 and Faraday cage 31 and at a fast rate intermediate the sensor and Faraday cage until time T4 when the electron beam is positioned along edge 76 of aperture 24 and the sharply sloping portion 77 of applied scan current waveform 67 rapidly moves the beam to the right hand portion of the detector. The electron beam then is traversed across sensors 26 and 27 in a manner similar to that described with sensors 25 and Faraday cage 31, e.g., the beam scanning portions of detector 15 proximate the sensors 25 and 31 for a relatively long time period with the distance between the sensors being traversed at a rapid rate. Scanning of the beam proximate sensors 26 and 27 continues until time T5 when the beam is situated along the edge 79 of aperture 24 and the sharply sloping portion 77 of waveform 67 returns the beam to the left hand side of the detector to repeat the beam traversal cycle.

The rapid traversal of the electron beam across workpiece 13 during the sharply sloping time rate portion of scan waveform 67 assures a short dwell of the electron beam upon workpiece 13 during location of the beam focal point thereby preventing damage to the workpiece. Similarly, the application of nonsynchronous current pulses to the deflection coil permits the beam to sweep along different paths across the workpiece during successive traversals. Because the detector preferably is positioned at an elevation differing from the sphere defined by the focal point of the scanned and swept electron beam, the energy density of the non-focused beam upon the detector is relatively low and the heat from the beam can be conducted away by the coolant flowing within conduits 28. Furthermore the elevated position of detector 15 relative to the plane of workpiece 13 allows an unobstructed view of the workpiece during detection of the focal point of the electron beam.

Although the described electron beam traversal and steering are produced by electromagnetic deflection of the electron beam, other known beam deflection methods such as electrostatic deflection also can be employed to effect these results. Similarly, the traversal pattern of the electron beam can be other than the pattern produced by nonsynchronous time rate change pulses provided at least two sensors are traversed by the beam during a traversal pattern.

When it is desired to spatially locate the electron beam focal point for a welding operation, Faraday cage 31 is positioned at a location empirically determined both for the workpiece thickness and for an electron beam of the desired welding power and standard reference voltage 45 is set at the voltage level produced by Faraday cage 31 during a traversal of a properly positioned electron beam of the welding power. Beam traversal pulses of 60 c.p.s. and 400 c.p.s. are applied to deflection coil 21 from square wave generators 56 and 57, respectively, and the beam is raised to a welding power level, e.g., a 150 ma. beam with a cathode potential of 25 kilovolts. The full power electron beam is swept and scanned across the sensors of detector 15 and the generated outputs from sensors 25 and 26 aligned in an X plane are summed over a three second time period in integrating circuits 40 and 36, respectively, and compared in comparator circuit 41 to produce an error signal of desired magnitude from current source 43. The integrated output signals from sensors 25 and 26 also are applied to discriminator circuit 35 to produce an output signal which is applied to current source 43 to control the polarity of the signal from the current source (e.g., the correctional direction in which the electron beam is moved along the X axis). The signal from current source 43 then is applied to steering coil 42 to centrally position the beam intermediate sensors 25 and 26.

Similarly, the generated outputs from sensors 26 and 27 aligned in an X plane are summed over a three second time period in integrating circuits 36 and 37, respectively, and compared both in comparator circuit 38 and discriminator circuit 48 to produce an error signal from current source 39 which signal is applied to steering coil 42 to centrally position the beam intermediate sensors 26 and 27, e.g., along a Y axis. Because the location of detector 15 is known relative to the position of workpiece 13, the centering of the electron beam within central aperture 24 of the detector results in a known beam location in the plane of the workpiece.

The axial position of the beam is controlled by the generated output signals from Faraday cage 31 which signals are summed over a three second interval and compared to a standard reference voltage, e.g. the voltage produced by Faraday cage 31 when situated at the focal point of a traversed electron beam of the welding intensity, to produce an axial error signal proportional to the variation between the actual focal point and the desired focal point. A comparison of the signals produced by axially displaced Faraday cages 31 and 32 produces a signal indicative of the axial correction direction and the axial correction signal is fed to servo amplifier 46 to control the direction of movement of manual focus control 47. The axial error signal also is applied to servo amplifier 46 to drive manual focus control to a position properly focusing the electron beam in an axial direction. Welding then is commenced by terminating the sweep and scan pulses applied to deflection coil 21. Prior to the termination of the sweep and scan pulses to the deflection coil, however, suitable means such as relays (not shown) serve to disconnect manual focus control 47 and current sources 39 and 43 from their input sources and the output signals from manual focus control 47 and current sources 39 and 43 are locked at their respective magnitudes to properly position the electron beam upon workpiece 13 for the duration of the welding cycle.

Detection of the electron beam focal point during welding is accomplished by utilization of the electron beam welding apparatus depicted in FIG. 4. Because detection is limited to a relatively short interval, e.g. 3–4 milliseconds for typical welding rates of one inch per second, the waveforms applied to deflection coil 21 from scan and sweep waveform generating circuits 62A and 62B, respectively, are of a frequency and configuration to produce at least a single traversal of two sensors during the 3–4 millisecond interval. Preferably all five beam sensors are traversed in a single beam deflection cycle of approximately 3.5 milliseconds.

Because beam detection is limited to a relatively short interval, a dual beam oscilloscope 80 having individual input terminals respectively connected to each of sensors 25, 26 and 27 is employed to allow a visual comparison of the transient signals from the sensors and manually adjustable current sources 39A and 43A connected to steering coil 42 are varied by an amount required to centrally position the beam between the sensors, e.g. produce an equal transient response from the aligned sensors. A second oscilloscope 82 has individual inputs connected to Faraday cages 31 and 32 to visually display the transient responses of the Faraday cages. The transient response of Faraday cage 31 is compared to the obtainable transient response for a beam of the welding power and manual focus control 47 is adjusted to focus the beam on workpiece 13 thereby producing the desired response from Faraday cage 31. Because there is no requirement that the beam intensity be diminished or the workpiece be removed during a focal point detection, welding of the workpiece can be commenced immediately after the beam has been located.

While several examples of this invention have been shown and described, it will be apparent to those skilled in the art that many changes and modifications may be made without departing from this invention in its broader aspects. Thus the electron beam positioning device of this invention is not necessarily limited to an electron beam welding apparatus and can be employed in any application, e.g. particle accelerators, wherein the positioning of a focused electron beam is required. Similarly, positively charged particle apparatus such as are employed in ion deposition can employ the beam detection device of this invention to properly position the ion deposition, and therefore the appended claims are intended to cover all such changes and modifications as fall within the true spirit and scope of this invention.

What I claim as new and desire to secure by Letters Patent of the United States is:

1. An electron beam apparatus comprising a source of electrons, means for focusing said electrons into a beam of welding intensity, at least three triangularly disposed sensors positioned about said electron beam at equidistant spans from a properly aligned electron beam, means for multiply traversing said welding intensity electron beam across said triangularly disposed sensors in a predetermined pattern and said beam traversal being produced by multiperiod electrical signals characterized by a generally continuously varying amplitude with time, the period of said signals being sufficiently small to inhibit electron beam dwell for the interval required to effect welding of the workpiece, means for summing the generated output signals from each of said individual sensors over a plurality of traversals, means for comparing the amplitudes of said summed signals from each sensor and means responsive to said comparison means for deflecting said electron beam to a location equidistant from each of said sensors.

2. An electron beam apparatus according to claim 1 wherein said predetermined pattern of beam traversal is produced by the application of nonsynchronous electrical signals to said electron beam traversal means.

3. An electron beam apparatus according to claim 2 wherein said nonsynchronous signals exhibit a time rate change producing a relatively slow electron beam traversal proximate said sensors and a relatively fast electron beam traversal intermediate said sensors.

4. An electron beam apparatus according to claim 2 wherein said traversal means is noncompensated to effect a generally spherical traversal of the electron beam focal point.

5. A charged particle beam apparatus according to claim 1 additionally including means for effecting a traversal of said charged particle beam, sensor means disposed remote from the desired beam impingement location along a path of constant radius which includes the focal point of the charged particle beam during the traversal of a properly positioned charged particle beam, said sensor means producing an output signal proportional to the axial deviation of the focal point of said charged particle beam from said desired beam impingement location, and means responsive to the output signal from said sensor means for focusing said beam upon said desired beam impingement location.

6. A charged particle beam apparatus according to claim 1 additionally including at least one sensor means located along a path of constant radius which includes the focal point of the beam during a charged particle beam traversal wherein the focal point passes through said desired beam impingement location.

7. An electron beam welding apparatus comprising an electron beam source, means for focusing said electron beam into a beam of desired welding intensity, a plurality of spaced-apart electron beam sensors disposed about said electron beam at an equidistant location from a properly aligned beam, means for traversing said beam across said sensors in a predetermined pattern at a sufficiently rapid rate to inhibit electron beam dwell for the interval required to effect welding of the workpiece, means for comparing the generated output signals from said sensors to determine the location of said electron beam along the plane of a workpiece to be welded, means responsive to a deviation of said electron beam from a desired location along the plane of the workpiece for positioning said beam upon said desired location, sensor means located along the traversal path of constant radius which includes the focal point of a properly positioned electron beam, said sensor means producing an output signal proportional to the axial deviation of said electron beam from said desired focal spot location, and means responsive to the output signal from said sensor means for focusing said beam upon said desired focal spot location.

8. An electron beam apparatus comprising a source of electrons and means for focusing said electrons into a beam of welding intensity, the improvement comprising means for effecting a traversal of said electron beam of welding intensity at a sufficiently rapid rate to inhibit electron beam dwell for the interval required to effect welding of the workpiece, sensor means disposed remote from the desired beam impingement location along a path of constant radius which includes the focal point of the electron beam during the traversal of a properly focused electron beam, said sensor means producing an output signal proportional to the axial deviation of the focal point of said electron beam from said desired beam impingement location, and means responsive to the output signal from said sensor means for focusing said electron beam upon said desired beam impingement location.

(References on following page)

References Cited

UNITED STATES PATENTS

| | | | |
|---|---|---|---|
| 2,956,169 | 10/1960 | King et al. | 250—49.5 |
| 3,152,238 | 10/1964 | Anderson | 250—49.5 |
| 3,207,982 | 9/1965 | Rose | 250—49.5 |
| 3,268,812 | 8/1966 | Meyer et al. | 219—121 |
| 3,293,429 | 12/1966 | Leboutet et al. | 250—49.5 |
| 3,308,264 | 3/1967 | Ullery | 219—121 |
| 3,326,176 | 6/1967 | Sibley | 219—121 |
| 3,371,274 | 2/1968 | Davey | 250—49.5 |

JOSEPH V. TRUHE, Primary Examiner

W. DEXTER BROOKS, Assistant Examiner

U.S. Cl. X.R.

250—49.5